United States Patent [19]

Ludwig et al.

[11] Patent Number: 5,492,629

[45] Date of Patent: Feb. 20, 1996

[54] METHOD OF CLEANING SCALE AND STAINS IN WATER SYSTEMS AND RELATED EQUIPMENT

[75] Inventors: Jerome H. Ludwig, Paradise Valley; Duane W. Sampson, Mesa, both of Ariz.

[73] Assignee: H.E.R.C. Products Incorporated, Phoenix, Ariz.

[21] Appl. No.: 134,044

[22] Filed: Oct. 12, 1993

[51] Int. Cl.$^6$ ........................................... C02F 5/10
[52] U.S. Cl. ........................... 210/698; 134/3; 134/27; 134/28; 210/752; 252/82; 252/180; 422/12; 422/16
[58] Field of Search .................... 210/696–701, 210/752, 765; 134/3, 27, 28, 41, 42; 252/82, 142, 180, 544, 546, 117, DIG. 11; 422/12, 16

[56] References Cited

U.S. PATENT DOCUMENTS

| | | | |
|---|---|---|---|
| 2,264,103 | 11/1941 | Tucker | 210/698 |
| 2,370,473 | 2/1945 | King | 210/697 |
| 2,758,970 | 8/1956 | Saukaitis et al. | 252/855 |
| 2,807,585 | 9/1957 | Gardner et al. | 252/148 |
| 2,941,949 | 6/1960 | Saukaitis | 252/141 |
| 3,000,795 | 9/1961 | Goeldner | 202/57 |
| 3,077,454 | 2/1963 | Monroe et al. | 252/148 |
| 3,080,590 | 3/1963 | Mullinix et al. | 15/1.7 |
| 3,085,975 | 4/1963 | Jennings | 210/697 |
| 3,607,781 | 9/1971 | Kaneko et al. | 252/389 |
| 3,668,137 | 6/1972 | Gardner | 252/149 |
| 3,885,913 | 5/1975 | Redmore et al. | 252/148 |
| 4,009,049 | 2/1977 | Pansini | 134/21 |
| 4,089,796 | 4/1978 | Harris et al. | 252/181 |
| 4,199,469 | 4/1980 | Walzer | 252/146 |
| 4,310,435 | 1/1982 | Frenier | 252/180 |
| 4,357,254 | 11/1982 | Kapiloff et al. | 252/181 |
| 4,541,945 | 9/1985 | Anderson et al. | 252/149 |
| 4,554,090 | 11/1985 | Jones | 252/181 |
| 4,587,030 | 5/1986 | Casey | 252/92 |
| 4,614,600 | 9/1986 | Schilling et al. | 252/148 |
| 4,637,899 | 1/1987 | Kennedy, Jr. | 252/542 |
| 4,670,186 | 6/1987 | Quinlan | 252/392 |
| 4,780,150 | 10/1988 | Anderson et al. | 134/3 |
| 4,802,990 | 2/1989 | Inskeep, Jr. | 210/699 |
| 4,851,149 | 7/1989 | Carandang | 252/147 |
| 4,906,384 | 3/1990 | Hamilton | 210/697 |
| 5,018,890 | 5/1991 | May | 410/46 |
| 5,101,851 | 4/1992 | Abadi et al. | 137/91 |
| 5,108,514 | 4/1992 | Kisner | 134/22.1 |
| 5,322,635 | 6/1994 | Hieatt et al. | 252/82 |

*Primary Examiner*—Peter A. Hruskoci
*Attorney, Agent, or Firm*—Wood, Herron & Evans

[57] ABSTRACT

A method for removing scale and stains from the interior surfaces of a water-containing system having a reservoir, auxiliary equipment and piping, without having to drain the water from the system. The use of inhibited mineral acid allows the water to be circulated throughout the entire system, cleaning all interior surfaces without damaging them. Once scale and stains are removed, the water is neutralized.

18 Claims, 1 Drawing Sheet

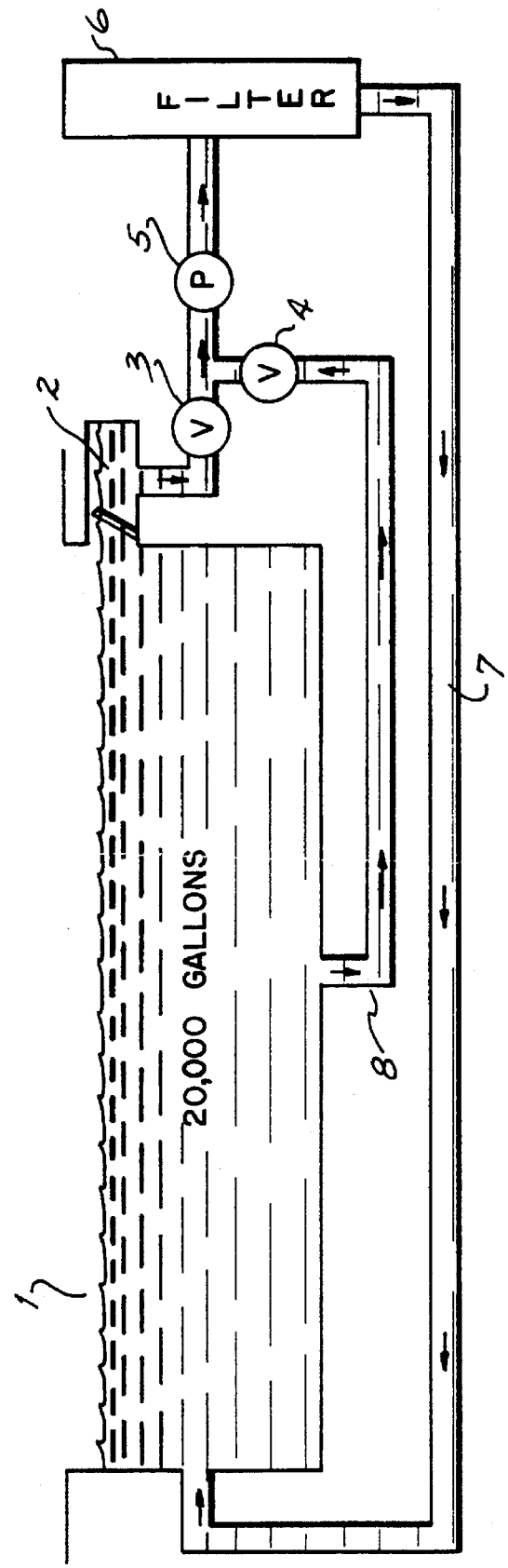

METHOD OF CLEANING SCALE AND STAINS IN WATER SYSTEMS AND RELATED EQUIPMENT

BACKGROUND OF THE INVENTION

This invention relates to a method for cleaning scale and stains from the interior surfaces of a water-containing system having a reservoir, auxiliary equipment and piping without having to drain the water from the system. Scale and stains are objectionable because they can be unattractive, particularly in swimming pools and spas, and lead to the coating and plugging of lines, filters, pumps, heaters and heat exchangers in the system thereby reducing their efficiency and effectiveness. Scale can also lead to microbiological havens and to undesirable corrosion of surfaces which would eventually require replacement of the corroded part. In all cases it is desirable to maintain the water-contact surfaces of the system in a scale and stain free condition.

Common practice has been to drain the water from the system and then physically scrape and/or wash the scale and stain from the surface with a strong mineral acid. This practice is dangerous to the owner or the service man who is required to wear protective clothing and also, most likely, a self contained air mask in order to comply with exposure limits for the mineral acids. The strong acid is also corrosive to the treated surfaces and does not clean the entire system. Additional cost would also always be incurred to fill the system with fresh water again.

Several other methods have been suggested in the prior art but all have disadvantages. For example, Hamilton in U.S. Pat. No. 4,906,384 employs a strong mineral acid treatment of the water in the vessel to remove scale deposits, without draining the water, at a level at which the total alkalinity is zero or a pH of 4.6 (Col. 3, line 5). Because the relatively dilute acid reacts slowly with the scale and is thereby consumed, the total alkalinity must continually be monitored and additional acid added, in order to maintain the pH at 4.6 to achieve the descaling and stain removal. If, for example, a swimming pool is badly scaled and stained, Hamilton's method would require considerable manpower and chemical testing to maintain the pH at 4.6 since the mineral acid added would be consumed by the relatively large amounts of scale and stain present.

Hamilton also suggests that the acidification treatment employ a metal sequestering and/or chelating agent such as ammonium salts or ethylenediamine tetraacetic acid (EDTA). By definition, sequestering agents react with certain metal ions to form coordination complexes. By definition, chelating agents react with metal ions to form a ring structure and strongly hold the metal ion through coordination bonding. Water scale ions, such as calcium, magnesium, iron and copper, may be changed in solution, by reacting with a chelating agent, from a positive ion to a complex negative ion. It is well known that this reaction is an equilibrium reaction and that chelation of the metal ion is less effective in acidic solution than in basic solution. Use of expensive chelating agents in acidic solution is not the most economical approach to scale and stain removal. In commercial literature, Hamilton also recommends that the circulating pump on the system be shut down during treatment. Therefore his method does not clean the entire system but only the main body of water.

Similarly, Kisner in U.S. Pat. No. 5,108,514 teaches a method of removing stains, scale and calcium deposits from the interior surfaces of swimming pools without draining the water by treating only the pool surfaces with a concentrated inorganic or mineral acid in combination with a strong metal chelating agent while the pool pump and circulation system is not operating. Again, Kisner does not clean the entire system and also employs the expensive chelating agent in an inefficient manner by using a concentrated mineral acid mixture. Also, the Kisner method employs a tedious means of applying the treating solution only to the surface of the swimming pool and requires additional man hours and the prolonged exposure to and the additional handling of hazardous strong mineral acid.

SUMMARY OF THE INVENTION

This invention is directed to a method for removing scale and stains from the interior surfaces of a water-containing system having a reservoir, auxiliary equipment and piping, without draining the system. The method consists of first acidifying the water by adding mineral acid and mineral acid inhibitor to the water in the system in an amount sufficient to remove the scale and stains. Next, the water is circulated through the system and remains in contact with the surfaces of the system to dissolve the scale and stains without adversely affecting the surfaces. After scale and stains are removed, the water is neutralized by adding a basic compound in an amount sufficient to raise the pH. All of these steps are done without draining the water from the system.

The acidifying mixture consists of an inhibitor and a mineral acid. The inhibitor is a nitrogen-containing organic compound, usually selected from the group consisting of an amine, quaternary ammonium compound, heterocyclic nitrogen compound, urea, thiourea, amide or mixtures thereof. In a preferred embodiment of the invention, the mineral acid inhibitor is a 1:1 soap of an amine or ammonia and an organic carboxylic acid such as a 1:1 soap of alkanolamine and hydroxyacetic acid. The mineral acid composition preferably used to remove scale and stains includes hydrochloric acid, a quaternary ammonium compound and a wetting agent. This composition is added to the water at the rate of about 0.5 to 1.5 gallons per 2500 gallons of reservoir capacity and in an amount sufficient to acidify the water to a pH of about 1.0 to 4.0, with the optimum range being a pH of from about 2.0 to 3.0.

Once the inhibited mineral acid composition has been added, the acidified water circulates throughout the water-containing system for about one to seven days, or even up to twenty-one days, depending upon the amount of scale and stains on the surfaces. The acidified water circulates throughout the reservoir, as well as the auxiliary equipment and piping of the water-containing system. This is usually accomplished by activating the system's circulating pump during the cleaning process.

If the scaling and staining are not excessive, the water containing system can also be cleaned effectively using the inhibited acid compositions at a pH of 1 to 4 by running the circulation pump on the normal periodic schedule. In some cases, the main body of water in the water containing system can be cleaned statically, without circulation, by employing the inhibited acids at a pH of 1 to 4 if desired.

After the scale and stains have been removed from the interior surfaces, the water is neutralized by adding a basic compound. The compound is added in an amount sufficient to raise the alkalinity of the water to a pH of from about 7.0 to about 7.6. Typically, the basic compound will be sodium carbonate or sodium bicarbonate.

This invention has several benefits and advantages over the prior art. The invention provides a safe, low cost and efficient method of cleaning scale and stain from the water contact surfaces of water containing systems such as swimming pools, spas, and associated equipment and piping systems and the like without having to drain such systems. Furthermore, the invention cleans the water transfer pipes, filters, pumps and heat exchangers in addition to the major water reservoir, without doing harm to the various surfaces being cleaned.

In addition, the invention provides a simple method that can be used by an ordinary person and that does not require individuals trained and equipped in handling hazardous materials or in technical methods of analysis. Moreover, the mineral acid inhibitors used in this invention have several advantages. In addition to preventing the mineral acid from damaging the surfaces of the water-containing systems, the inhibitors are biodegradable and also act as a low cost metal carrying agent, maintaining scale and stain ions in solution after the cleaning process is complete.

These objectives and advantages along with other aspects of the invention will be further understood with reference to the following drawing and description:

BRIEF DESCRIPTION OF THE DRAWING

The FIGURE is a diagrammatic illustration of a swimming pool system that is cleaned employing the method of this invention.

DETAILED DESCRIPTION OF THE INVENTION

The present invention provides an improved method of removing water scale and stain from the interior surfaces of a water-containing system having a reservoir, auxiliary equipment and piping without draining the system. The cleaning is achieved by employing an inhibited mineral acid solution and circulating the water in the system until the scale and stains are removed. The cleaning solutions of this invention are most effective between a pH of 1.0 to 4.0 with the preferred range being between pH of 2.0 to 3.0 or 0.01 to 0.001 moles of hydrogen ion per liter of water. At this hydrogen ion concentration, the inhibited acid solution readily dissolves the scale and stains without adversely corroding or attacking the water contact surfaces of the system.

Various inhibitors for mineral acids have been well documented in the patent art. Typical, but not necessarily all inclusive, examples of acid inhibitors are disclosed in the following U.S. Pat. Nos. 2,758,970; 2,807,585; 2,941,949; 3,077,454; 3,607,781; 3,668,137; 3,885,913; 4,089,796; 4,199,469; 4,310,435; 4,541,945; 4,554,090; 4,587,030; 4,614,600; 4,637,899; 4,670,186; 4,780,150 and 4,851,149 which are included in this application by reference.

This invention in part depends upon the use of suitable mineral acid inhibitors in combination with mineral acid, for cleaning water-containing systems without draining. Generally, inhibitors for mineral acids are nitrogen containing organic compounds such as amines and amine derivatives like the ethylene oxide condensates; quaternary ammonium and quaternary amines and derivatives; various heterocyclic nitrogen compounds, urea and thiourea derivatives, amides, and the like. Surfactants may also be employed in the inhibited acid compositions. The surfactants reduce the surface tension of the solutions and enhance the activity of the inhibitors and acids employed. They may be anionic cationic, nonionic or amphoteric as defined in the art.

As mentioned above, the preferred inhibitors of this invention are 1:1 soaps, i.e., quaternary compounds of weak organic acids with amines as described in the co-pending U.S. patent application Ser. No. 07/700,780 filed May 16, 1991 which is incorporated herein by reference. The preferred weak organic acids employed in the quaternary compounds for mineral acid inhibition are those that form relatively soluble derivatives of calcium and magnesium such as acetic acid, hydroxyacetic acid, citric acid, gluconic acid, tartaric acid, salicylic acid and benzoic acid. Oxalic acid is not preferred as it forms a very insoluble calcium derivative with solubility similar to calcium carbonate scale itself. The following Table 1 illustrates the solubility of various calcium and magnesium derivatives of organic acids in water solution.

TABLE I

| SOLUBILITIES OF VARIOUS ORGANIC ACID DERIVATIVES OF CALCIUM AND MAGNESIUM | |
|---|---|
| Calcium Acetate | 37.4 g./100 ml @ 0 C. |
| Calcium Benzoate | 8.3 g./100 ml @ 80 C. |
| Calcium Hydroxyacetate | 1.2 g./100 ml @ 18 C. |
| Calcium Citrate | 1.0 g./100 ml @ 23 C. |
| Calcium Oxylate | 0.00067 g./100 ml @ 13 C. |
| Calcium Carbonate | 0.00153 g./100 ml @ 25 C. |
| Magnesium Hydroxyacetate | 7.9 g./100 ml @ 18 C. |

The preferred amines employed in the quaternary compounds for mineral acid inhibition are those with high water solubility such as ammonia; alkanolamines including monoethanolamine, diethanolamine, triethanolamine, triisopropanolamine, and isopropanolamine; and alkylamines such as diethylamine.

The intrinsic character of the preferred quaternary compounds employed in the method of this invention makes them particularly suitable for their use as the mineral acid inhibitors in the compositions employed to remove the scale and stain. Not only are they mineral acid inhibitors, but they provide a means of carrying scale and stain causing ions, such as calcium and magnesium ions, in solution by forming the corresponding water soluble metal soaps of the organic acids upon neutralization of the mineral acid employed for the removal of the scale and stain. This is particularly desirable for applications in systems such as swimming pools and spas, where the mineral acid is neutralized prior to placing the system back into its intended use.

Generally, the invention is practiced by the addition of the inhibited acid solution to the major water reservoir. The amount of inhibited acid solution required to remove the scale and stain from the water system will vary depending upon the degree of scale and stain present and the volume of the water in the system. We have found that a suitable inhibited acid solution can contain about 25% hydrochloric acid and about 20–25% of solution of a quaternary compound in combination with a wetting agent. This inhibited acid can generally be employed in cleaning applications at the rate of about 0.5 to 1.5 gallons/2500 gallons of reservoir capacity depending on the level of scale and stain to be removed and assuming that the system water is balanced to typical water management conditions with a pH of about 7. The pH of the system, upon treatment with this level of inhibited acid would be in the range of 2.8 to 2.3.

The time required for cleaning depends upon the degree of scale and stain present, and is usually from one to twenty-one days. It is also recommended in the cleaning of swimming pools and spas that the reservoir be brushed periodically. This is normally required as most scale also contains a biomass, resulting from body oils, vegetation, and chlorination residuals, that tends to hold scale particles together and which will amass on the surface upon solution of the surface scale or stain. The inhibitors and wetting agents employed in the treatment solution also assist in breaking up the biomass bonding, thus further assisting in scale and stain removal.

Because the cleaning process usually releases some silt and other acid insolubles from the scale deposits, a swimming pool or spa generally will require vacuuming to remove the remaining insoluble solids left after scale and stain removal. After scale and stain has been removed, the system then can be restored to normal operation by adjusting the pH to the normal use level of pH 7.0–7.6 with any of the usual water management chemicals such as sodium carbonate or sodium bicarbonate. When unusually heavily scaled and stained pools and spas are cleaned, it is sometimes best to increase the volume and frequency of filter backwashing or to drain the water from the system after the cleaning process to remove the high levels of scale and stain ions present.

The invention provides several improvements over the prior art. The Hamilton method of U.S. Pat. No. 4,906,384 employs a mineral acid added to the system water to maintain a zero alkalinity or a pH of 4.6 equivalent to 0.000025 moles of hydrogen ion per liter of water to clean scale and stain from swimming pools. The inventive inhibited acid solutions are employed preferably at over 10 to 100 times more concentrated in hydrogen ion than the Hamilton method (pH of 3.6 is 10 times more and a pH of 2.6 is 100 times more concentrated) which will inherently reduce the time required to remove the scale and stain. Hamilton requires additional manpower for the constant monitoring of the alkalinity and additional addition of acid during treatment as the low level of acid is rapidly consumed when dissolving the scale and stain. At the level of inhibited acid employed in our method, monitoring is not usually required as there is sufficient inhibited acid employed to dissolve all scale and stain present. Only in extreme cases of scaling would simple monitoring of pH with a broad range pH paper be required. Furthermore, the Kisner method of U.S. Pat. No. 5,108,514 employs a very strong mineral acid at high concentrations, i.e., 20–31.5% hydrochloric or 5.5 to 8.6 moles of acid/liter directly to the surface of the pool with the circulating pump off. This level of acid is over 500 times the preferred level of this invention and Kisner can be extremely corrosive to pool system surfaces. Kisner's treatment solution would destroy most metal parts if applied to their surfaces and that is why Kisner discloses treating only the surface of the pool in the procedure and not the auxiliary equipment and piping.

By employing inhibited mineral acids of this invention, it has been found that scale and stain removal can be achieved efficiently and simply from all of the water contact surfaces in the entire system with no harmful corrosion of the surfaces. Additionally, by proper selection of the inhibitor, residual metal ions are held in solution upon completion of the cleaning.

When inhibited acids are employed at a pH of 1 to 4 and the scaling and staining of the water containing system is not excessive, cleaning can be achieved by leaving the circulation pump running on the usual periodic circulation schedule.

In some cases, it may be desirable to employ the inhibited acids at a pH of 1 to 4 and leave the circulating pump off completely to achieve the cleaning of the main body of water in the water system, i.e., if the pump or filter is being replaced during renovation of the system. Using the inhibited acid at a low pH will dissolve the scale and stain rapidly particularly with periodic brushing of the water contact surfaces.

The preferred method is to leave the circulating pump on during the cleaning process employing inhibited acids at a pH of 1 to 4. Cleaning of the entire system in the shortest possible time will then be achieved.

EXAMPLE

As an example of the method of this invention, a 20,000 gallon plastered pool was selected that was very badly scaled and stained over 80% of the visible surface (see DRAWING). The water was analyzed to have a pH of 8.2 with total alkalinity of 180 and hardness of 800. Theoretically a pool of this capacity would require about 2.3 gallons of the preferred inhibited acid solution of 25% hydrochloric acid with 20–25% of a solution of a quaternary compound such as a 1:1 soap of ethanolamine and hydroxyacetic acid in combination with a wetting agent in order to reduce the pH to 3.0.

It was concluded, because of the poor condition of the pool, 23 gallons of the inhibited acid solution to reduce the pH to 2 should be employed to assure scale and stain removal. The 23 gallons of cleaning solution were added to the 20,000 gallons of pool water and circulated throughout the entire system for a period of 27 hours. With reference to the FIGURE, the acidified water was circulated by opening the skimmer valve 3 and the bottom drain valve 4 and activating the circulation pump 5. The water then circulated through the pool 1, skimmer 2, and bottom drain 8 and through the pool filter 6. The pool filter 6 was a paper cartridge filter of 100 sq. ft. surface area. After 27 hours the pH was at 2.5. The circulation was continued for an additional 12 hours at which time the pH was 3.5. The pool was then observed to be essentially clean of scale and stain. Sodium carbonate was then added to balance the pool to a pH of 7.2. The hardness had increased to 1800. The paper cartridge filter was intact and clean of scale and stain.

Other modifications of this invention may be made without departing from its scope as will be understood to a person of ordinary skill in this art.

What is claimed is:

1. A method for removing scale and stains from the interior surfaces of a water-containing system having a reservoir, auxiliary equipment and piping without draining said system which comprises:

acidifying the water by adding mineral acid and mineral acid inhibitor to the water in said system in an amount sufficient to remove the scale and stains;

allowing the acidified water to remain in contact with said surfaces to dissolve the scale and stains, said mineral acid inhibitor contained in said acidified water in an amount to prevent the mineral acid from corroding said interior surfaces of the water-containing system; and neutralizing the water after scale and stains are removed by adding a basic compound in an amount sufficient to raise the pH without draining the water from said system.

2. The method of claim 1 comprising the further step of circulating the water through said system.

3. The method of claim 1 wherein said inhibitor is a 1:1 soap of an amine or ammonia and an organic carboxylic acid.

4. The method of claim 1 wherein said inhibitor is a 1:1 soap of alkanolamine and hydroxyacetic acid.

5. The method of claim 1 wherein the step of acidifying the water comprises adding a mixture of hydrochloric acid, quaternary ammonium compound and a wetting agent.

6. The method of claim 5 wherein said mixture is applied to the water at the rate of about 0.5 to about 1.5 gallons per 2,500 gallons of reservoir capacity.

7. The method of claim 1 wherein said mineral acid is added to the water in an amount sufficient to acidify the water to a pH of from about 1 to about 4.

8. The method of claim 7 wherein said mineral acid is added to the water in an amount sufficient to acidify the water to a pH of from about 2 to about 3.

9. The method of claim 1 wherein the acidified water circulates throughout said system for about one to about twenty-one days.

10. The method of claim 1 wherein said basic compound is added in an amount sufficient to raise the alkalinity of the water to a pH of from about 7 to about 7.6.

11. The method of claim 10 wherein said basic compound is comprised of sodium carbonate or sodium bicarbonate.

12. The method of claim 1 wherein said mineral acid inhibitor is a nitrogen-containing organic compound.

13. The method of claim 12 wherein said mineral acid inhibitor is selected from the group consisting of an amine, quaternary ammonium compound, heterocyclic nitrogen compound, urea, thiourea, amide, and mixtures thereof.

14. A method for removing scale and stains from the interior surfaces of a water-containing swimming pool or spa system having a reservoir, auxiliary equipment and piping, without draining said system which comprises:

acidifying the water by adding mineral acid and mineral acid inhibitor to the water in said system in an amount sufficient to remove the scale and stains;

circulating the water through said system thereby allowing the acidified water to remain in contact with said surfaces to dissolve the scale and stains, said mineral acid inhibitor contained in said acidified water in an amount to prevent the mineral acid from corroding said interior surfaces of the water-containing system; and neutralizing the water after scale and stains are removed by adding a basic compound in an amount sufficient to raise the pH without draining the water from said system.

15. The method of claim 14 wherein said inhibitor is a 1:1 soap of an amine or ammonia and an organic carboxylic acid.

16. The method of claim 14 wherein the step of acidifying the water comprises adding a combination of about 25% hydrochloric acid and from about 20% to about 25% of a mixture of a quaternary ammonium compound with a wetting agent.

17. The method of claim 14 wherein said mixture is applied to the water at the rate of about 0.5 to about 1.5 gallons per 2,500 gallons of reservoir capacity.

18. The method of claim 14 wherein said mineral acid is added to the water in an amount sufficient to acidify the water to a pH of from about 1.0 to about 4.0.

* * * * *